United States Patent
Vishnu

(10) Patent No.: US 11,620,525 B2
(45) Date of Patent: Apr. 4, 2023

(54) DROPOUT FOR ACCELERATED DEEP LEARNING IN HETEROGENEOUS ARCHITECTURES

(71) Applicant: ADVANCED MICRO DEVICES, INC., Santa Clara, CA (US)

(72) Inventor: Abhinav Vishnu, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 923 days.

(21) Appl. No.: 16/141,648

(22) Filed: Sep. 25, 2018

(65) Prior Publication Data

US 2020/0097822 A1 Mar. 26, 2020

(51) Int. Cl.
| | | |
|---|---|---|
| G06N 3/063 | (2006.01) | |
| G06N 3/082 | (2023.01) | |
| G06N 3/084 | (2023.01) | |
| G06T 1/20 | (2006.01) | |
| G06F 17/16 | (2006.01) | |
| G06N 3/04 | (2023.01) | |

(52) U.S. Cl.
CPC ............. *G06N 3/082* (2013.01); *G06F 17/16* (2013.01); *G06N 3/04* (2013.01); *G06N 3/084* (2013.01); *G06T 1/20* (2013.01)

(58) Field of Classification Search
CPC .......... G06N 3/082; G06N 3/04; G06N 3/084; G06F 17/16; G06T 1/20
USPC ........................................................ 706/15
See application file for complete search history.

(56) References Cited

U.S. PATENT DOCUMENTS

| | | | |
|---|---|---|---|
| 10,657,438 B2* | 5/2020 | Lie | G06F 5/06 |
| 11,218,498 B2* | 1/2022 | Hajimirsadeghi | H04L 41/16 |
| 2019/0213470 A1* | 7/2019 | Schmidt | G06N 3/063 |

OTHER PUBLICATIONS

Dahl, et al., "Improving deep neural networks for LVCSR using rectified linear units and dropout", 2013 IEEE International Conference on Acoustics, Speech and Signal Processing (Year: 2013).*
Deng, et al., "New types of deep neural network learning for speech recognition and related applications: an overview", 2013 IEEE International conference on Acoustics, Speech and Signal Processing (Year: 2013).*
Srivastava, Nitish, et al., "Dropout: A Simple Way to Prevent Neural Networks from Overfitting", Journal of Machine Learning Research, vol. 15, Jun. 2014, 30 pages.
Graham, Ben, et al., "Efficient batchwise dropout training using submatrices", Cornell University Library, arXiv.org, arXiv: 1502.02478, Feb. 9, 2015, 14 pages.

* cited by examiner

*Primary Examiner* — Tsu-Chang Lee

(57) ABSTRACT

A heterogeneous processing system includes at least one central processing unit (CPU) core and at least one graphics processing unit (GPU) core. The heterogeneous processing system is configured to compute an activation for each one of a plurality of neurons for a first network layer of a neural network. The heterogeneous processing system randomly drops a first subset of the plurality of neurons for the first network layer and keeps a second subset of the plurality of neurons for the first network layer. Activation for each one of the second subset of the plurality of neurons is forwarded to the CPU core and coalesced to generate a set of coalesced activation sub-matrices.

20 Claims, 3 Drawing Sheets

DROPOUT FOR ACCELERATED DEEP LEARNING IN HETEROGENEOUS ARCHITECTURES

BACKGROUND

Neural networks are computational systems based on biological neural network architecture, and are utilized in a variety of applications including, for example, document search, time series analysis, medical image diagnosis, character, speech, and image recognition, and data mining. Neural networks include a large number of interconnected nodes, and the nodes are be separated into different layers, with the connections between the nodes being characterized by associated vector weights. Each node may include an associated function which causes the node to generate an output dependent on the signals received on each input connection and the weights of those connections.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

In machine learning/training, overfitting occurs when a statistical model describes random error or noise in a set of observations instead of the underlying relationship of the observations. Overfitting generally occurs when a model is excessively complex, such as having too many parameters relative to the number of observations. A model that has been overfit will generally have poor predictive performance, as it can exaggerate minor fluctuations in the data. Overfitting sometimes occurs when a model begins to "memorize" training data rather than "learning" to generalize from trends in the data. As an example, if the number of parameters is the same as or greater than the number of observations, a model or learning process may be able to perfectly predict the training data simply by memorizing the training data in its entirety, but such a model will typically fail when making predictions about new or unseen data, since the model has not learned to generalize.

Neural network performance may be improved by training the neural network through randomly zeroing, or "dropping out" a portion of the inputs or outputs of a given node or layer in the neural network (e.g., dropout training) for each of one or more training sets (including a set of inputs and corresponding expected outputs) to tune network parameters (number of layers, number of nodes per layer, number of training iterations, learning rate, etc.). Dropout training prevents the detectors in the network from co-adapting, and so encourages the discovery of approximately independent detectors, which in turn limits the capacity of the network and prevents overfitting.

A computing system on which dropout training is performed may include heterogeneous processors, such as central processing units (CPUs) and graphics processing units (GPUs). The heterogeneous processors may be also logically connected via a shared memory through support for a unified (i.e., shared) memory address space. In various computing systems, including heterogeneous CPU-GPU systems, CPUs excel at handling small sets of complex instructions and the parallel architecture of GPUs excel at handling many sets of simple instructions. Most of the computation involved in the training process for neural networks includes matrix multiplication, which is a simple but broad task—the calculations are simple and easy, but there is a large amount of them. Thus, the majority of computational work is performed by GPUs in neural network training and the CPUs are generally underutilized.

Figure 1:
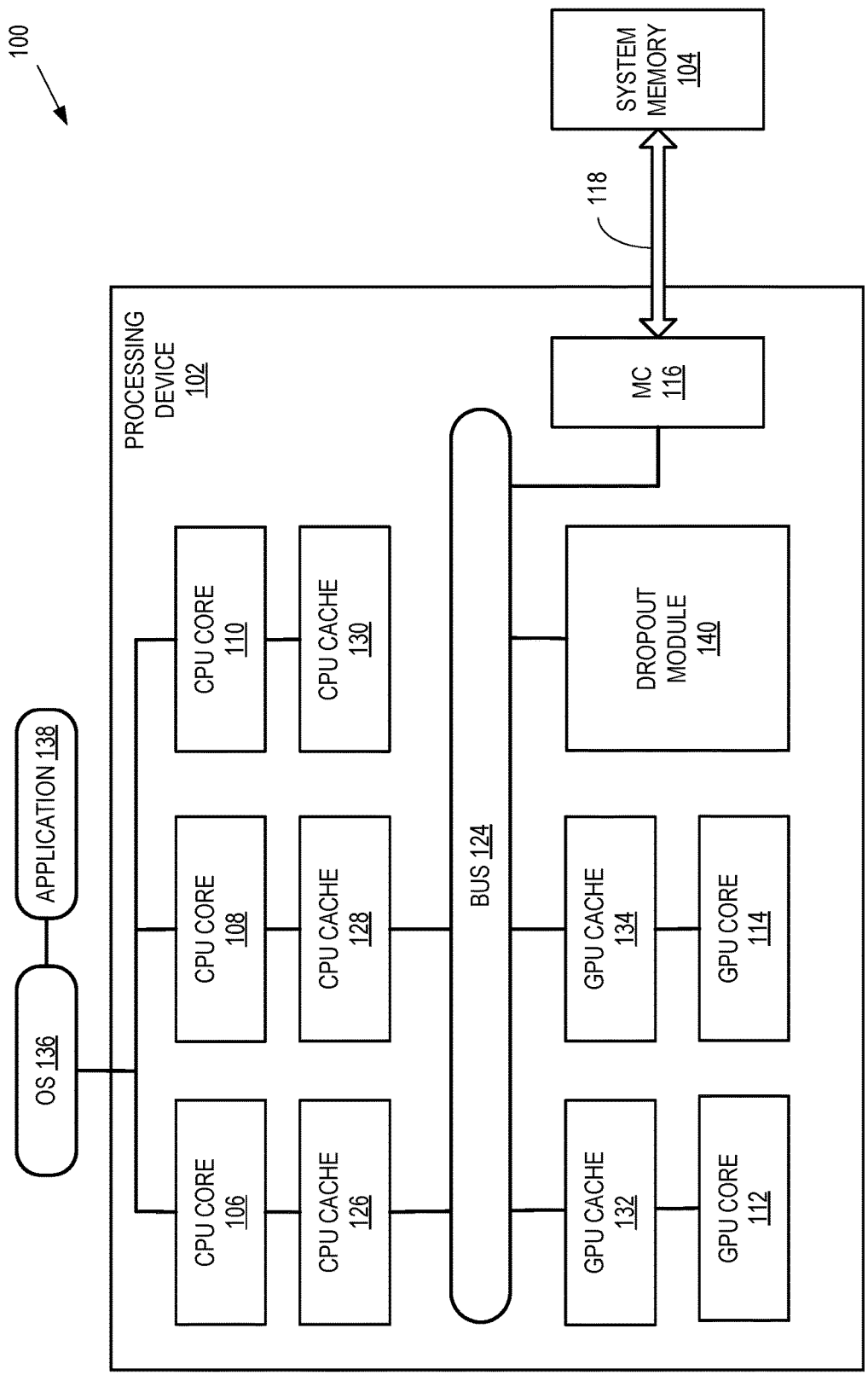
FIG. 1 is a block diagram of a processing system including heterogeneous processors in accordance with some embodiments.
Figure 2:
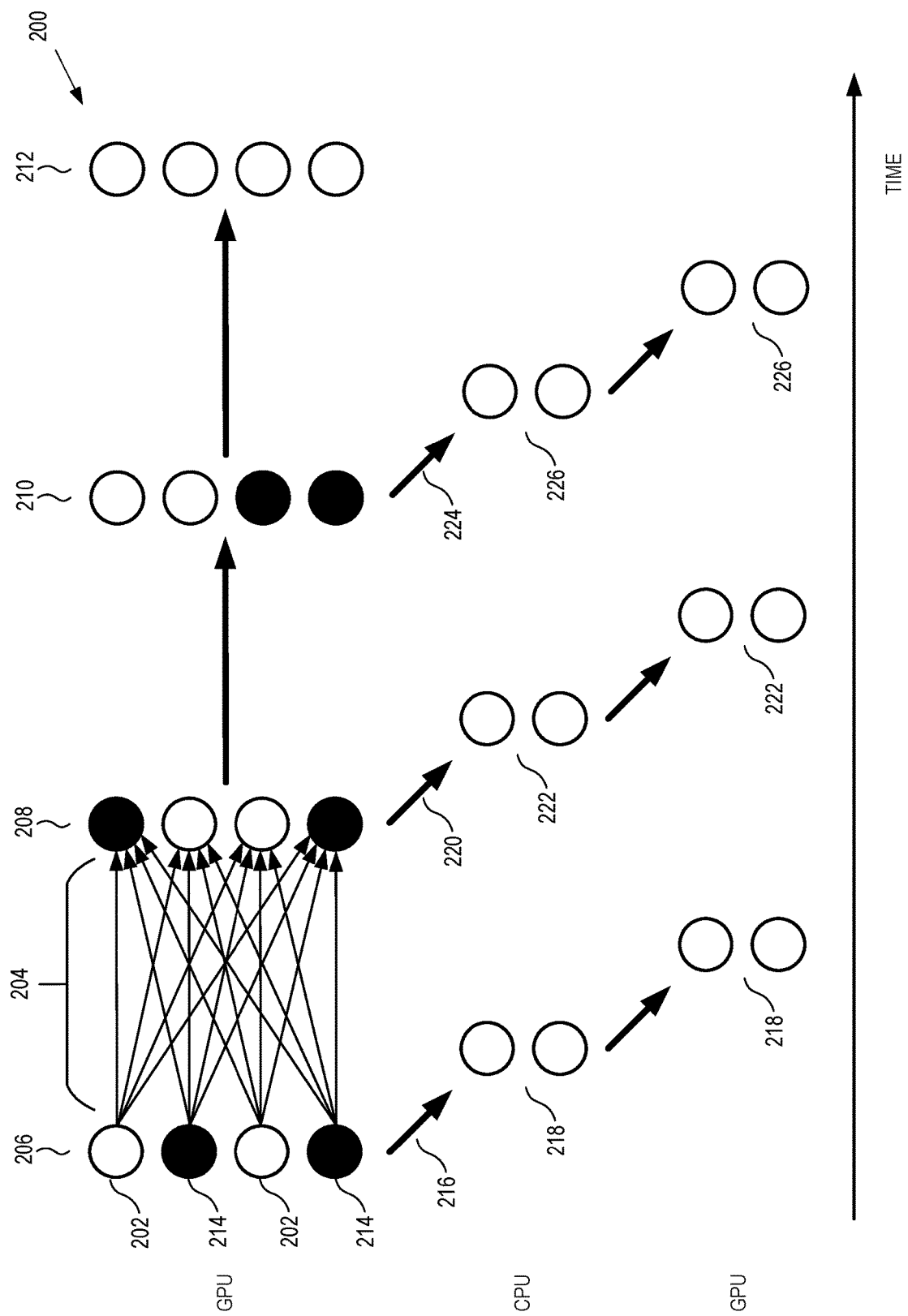
FIG. 2 is a block diagram of a neural network with coalesced network layers in accordance with some embodiments
Figure 3:
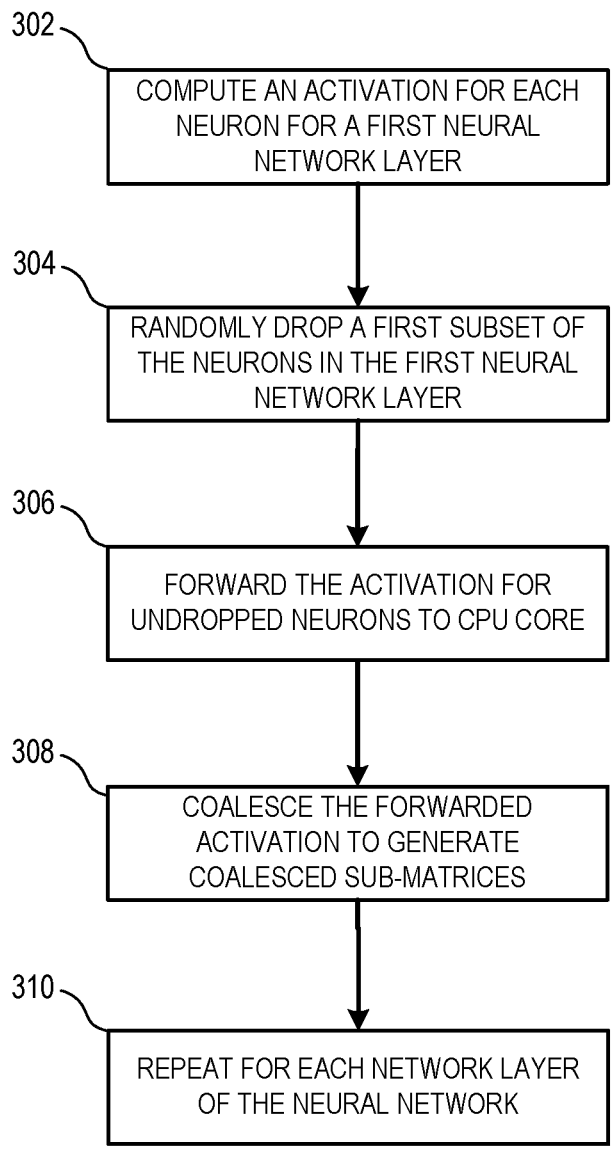
FIG. 3 is a flow diagram of a method for CPU-assisted coalescing of a neural network according in accordance with some embodiments.

Accordingly, FIGS. 1-3 illustrate techniques for improving system performance leveraging heterogeneous system architectures. In some embodiments, a heterogeneous processing system, including at least one central processing unit (CPU) core and at least one graphics processing unit (GPU) core, is configured to compute an activation for each one of a plurality of neurons for a first network layer of a neural network. The heterogeneous processing system randomly drops a first subset of the plurality of neurons for the first network layer and keeps a second subset of the plurality of neurons for the first network layer. Activation for each one of the second subset of the plurality of neurons is forwarded to the CPU core and coalesced to generate a set of coalesced activation sub-matrices. The heterogeneous processing system provides a CPU-assisted pipelined, layer-wise coalescing of the dropped neural network, such that GPU hardware can leverage compute units (CUs) in the GPU core effectively. The coalesced neural network, as represented by the set of coalesced activation sub-matrices, improves compute efficiency of heterogeneous CPU-GPU architecture by coalescing the activations from each neural network layer into contiguous space which allows for more efficient execution of operations at the processing system.

FIG. 1 is a block diagram of a processing system 100 including heterogeneous processors in accordance with some embodiments. The processing system 100 includes a processor 102 that is connected to a system memory 104, such as a dynamic random access memory (DRAM). The processor 102 includes a plurality of compute units 106, 108, 110, 112, 114 (collectively referred to as the "compute units 106-114") such as central processing unit (CPU) cores 106, 108, 110 and graphics processing unit (GPU) cores 112, 114. Each of the compute units 106-114 includes one or more processor cores that concurrently process different instructions. The compute units 106-114 also include one or more resources that are shared by the processor cores, such as caches, arithmetic logic units, floating-point units, branch prediction logic, memory or bus interfaces, and the like.

The processor 102 may be implemented as a single integrated circuit, or as a combination of multiple integrated circuits. For example, the processor 102 can be fabricated as a system-on-a-chip (SoC) such as an accelerated processing unit (APU) or accelerated processing device (APD) that is formed on a substrate. To illustrate, the processor 102 (and the functional units formed thereon) may form part of one semiconductor die, while the system memory 104 forms part of a different semiconductor die. In other embodiments, CPU cores and GPU cores may be formed on different dies.

The processor 102 is associated with corresponding memory elements, which may be internal to (e.g., implemented on) the processor 102 or external to the processor 102 (e.g., system memory 104). For example, the processor 102 is connected to the external system memory 104. The processor 102 includes a memory controller (MC) 116 that coordinates the flow of data between the processor 102 and the system memory 104 over a memory interface 118. The memory controller 116 includes logic used to control reading information from the system memory 104 and writing information to the system memory 104. In other embodiments, the processor 102 is associated with other different types of internal or external memory elements.

The compute units 106-114 communicate with each other, with the memory controller 116, or with other entities in the processing system 100 using a bus 124. For example, the compute units 106-114 can include a physical layer interface or bus interface for asserting signals onto the bus 124 and receiving signals from the bus 124 that are addressed to the corresponding compute unit 106-114. Some embodiments of the processor 102 also include one or more interface blocks or bridges such as a northbridge or a southbridge for facilitating communication between entities in the processor 102. In some embodiments, the bus 124 includes a coherent data fabric that interconnects the compute units 106-114.

The processor 102 includes one or more levels of cache associated with each of the compute units 106-114. Caches 126, 128, 130, 132, 134 (i.e., CPU caches 126, 128, 130 and GPU caches 132, 134; collectively referred to herein as "the caches 126-134") are used to store (i.e., cache) copies of information stored in the memory 104. Memory transactions for the CPU or GPU cores are then satisfied using the cached copy of the information instead of performing the memory transaction directly on the information stored in the memory 104. The blocks used to represent the caches 126-134 may represent a single cache or a plurality of caches such as a cache hierarchy. For example, in one embodiment, the cache 126 represents a cache hierarchy including multiple cache levels such as an L1 cache, an L2 cache, or an L3 cache. In at least one embodiment, each of the caches 126-134 includes a set of entries, each entry storing an associated unit of data referred to as a cache line.

The processor 102 executes an operating system (OS) 136. Although a single instance of the OS 136 is shown in FIG. 1, some embodiments of the processor 102 execute multiple instantiations of the operating system or one or more applications. The processor 102 also executes an application 138 that generates work in the processor 102.

The processor 102 further includes a dropout module 140 for performing dropout operations. As described in further detail below, the dropout module 140 is configured to randomly drop a first subset of the plurality of neurons for a first neural network layer and keep a second subset of the plurality of neurons for the first neural network layer. The dropout module 140 instructs one of the CPU cores 106, 108, 110 to coalesce forwarded activation to generate a set of coalesced activation sub-matrices that are contiguous in a memory of the processing system, thereby leveraging the CPU cores 106, 108, 110 for re-organizing a dropped neural network to use GPU architecture more effectively when training a neural network.

FIG. 2 is a block diagram of a neural network 200 with coalesced network layers in accordance with some embodiments. The neural network 200 includes a plurality of neurons 202 (also commonly known as nodes) that communicating using one or more of a plurality of connections 204. The neural network 200 includes a plurality of layers, including, for example, one or more input layers 206 (commonly known as visible layers), one or more hidden layers 208 and 210, and one or more output layers 212. Only the connections 204 between the input layer 206 and the hidden layer 208 are illustrated in FIG. 2 for ease of illustration.

In one embodiment, neurons 202 at each layer are configured to apply any function (e.g., input program, input data, etc.) to any previous layer to produce output, and the hidden layers 208, 210 are configured to transform inputs from the input layer 206 (or any other layer) into output for neurons 202 at different levels. For example, the output of hidden layer 208 is used as input to the next layer in the network (i.e., hidden layer 210) and the output of hidden layer 210 is used as input to the output layer 212 of the neural network 200.

Each neuron 202 in the input layer 206 (and also in the hidden layers 208, 210) represents a training data item and is characterized by its weight, bias, and activation function, as generally understood by those skilled in the art. In various embodiments, each of the neurons 202 performs a linear transformation on input according to its associated weights and biases. Further, a non-linear transformation is performed by an activation function (not shown). The resulting information, referred to as activation, is transferred from the input layer 206 to the hidden layer 208. This forward movement of information is referred to as the feed forward.

As the neural network 200 learns, neuron weights settle into their context within the neural network 200. Weights of neurons 202 are tuned for specific features providing some specialization. Neighboring neurons come to rely on this specialization, which if taken too far result in a fragile model too specialized to the training data. This reliance on context for a neuron 202 during training is referred to complex co-adaptations. Accordingly, in various embodiments, the dropout module 140 (of FIG. 1) performs a technique referred to as dropout by masking a fraction of the output from the input layer 206. The term "dropout" refers to dropping out nodes (e.g., hidden or visible) in the neural network 200 during training (e.g., temporarily removing the one or more nodes from the network, often including all incoming and outgoing connections). Dropout randomly selects a number of neurons from one or more layers of the neural network 200 to be ignored during training such that contributions from each dropped neuron is temporarily removed from the feed forward and any weight updates are not applied to the dropped neuron on the backpropagation pass. In various embodiments, dropout is performed to prevent overfitting (i.e., a situation where the neural network 200 has memorized the training set). Dropout also allows for redundancy in the overall neural network 200.

In the example of FIG. 2, dropout occurs between the input layer 206 and the hidden layer 208 at a dropout rate of 50%, meaning as each training data item (not shown) for a mini-batch is presented, some of the nodes are randomly selected to be dropped for the current training item. Dropout training is performed by randomly dropping one or more neurons 214 (i.e., nodes 202 shaded as black, hereinafter referred to as dropped neurons 214) in the neural network 200. Specifically, each node 202 independently has a probability equal to 0.50 of being dropped. This means that no nodes 202 might be selected to be dropped, or all nodes 202 might be selected, but on average, about half of the neurons 202 will be selected as dropped neurons 214 for each training item.

It should be recognized that although described here in the context of performing dropout by randomly dropping half the neurons 202 in each layer, any fraction of the nodes can be dropped without departing from the scope of this disclosure. In various embodiments, the choice of which neurons 202 to drop is random from layer to layer of the neural network 200 and further is random from each mini-batch (i.e., a subset) of a dataset used to train the neural network 200. By performing dropout batchwise, one pattern of dropout is used for each sample in a mini-batch. Accordingly, the structure of the neural network 200 and the particular dropped neuron 214 dropped in each layer will differ after each mini-batch and also across different epochs. Applying dropout to the neural network 200 results in a network model with fewer nodes, and therefore less complexity during training and/or testing. In one embodiment, a plurality of network models (of single or multiple networks) may be generated using dropout training, and this ensemble of models is employed to improve generalization performance.

As dropped neurons 214 are randomly dropped out of the neural network 200 during training, other remaining neurons 202 will have to step in and handle the representation required to make predictions for the dropped neurons 214. This in turn results in a neural network 200 that is capable of better generalization and is less likely to overfit the training data. In particular, dropped neurons 214 prevent nodes 202 in the hidden layers 208 and 210 from co-adapting with each other, forcing the model to rely on only a subset of the hidden nodes. This makes the resulting neural network more robust. Another way of looking at the dropout training described herein is that dropout generates many different virtual subsets of the original neural network 200 and then these subsets are averaged to give a final network that generalizes well. The effect is that the neural network 200 becomes less sensitive to the specific weights of neurons 202.

In various embodiment, dropout includes multiplying the dropped activations by zero. However, the dropped neurons 214 are not physically removed from the neural network 200; rather, the dropped neurons 214 are virtually removed by ignoring them. However, the activations of the dropped neurons 214 remain associated with the matrices associated with the training of the neural network 200 (e.g., matrix of connection weights between the input layer 206 and the hidden layer 208) and are involved in the feed forward computations. This is mostly for reasons of parallelization for computations to remain efficient on GPUs (e.g., GPU cores 112, 114 of FIG. 1). Additionally, in various embodiments, the heterogeneous processor 102 defines sub-matrices of the weight and dropped neuron matrices. However, the use of sub-matrices leads to sub-optimal use of the GPU cores 112, 114 due to non-coalesced accesses (e.g., from the random dropouts leading to empty rows) to the sub-matrices.

In some embodiments, the processor 102 performs layer-wise coalescing of the dropped neural network (which has empty rows) resulting from dropped neurons 214 in the input layer 206 and hidden layers 208, 210, such that GPU hardware is able to leverage compute units (CUs) effectively. To reduce unnecessary computation, the GPU (e.g., at one or more of the GPU cores 112, 114) generates a dropped neural network map based on the dropped neurons 214 from dropout and forwards activations from the neurons 202 of the input layer 206 (i.e., the neurons which were not dropped) to the CPU (e.g., at one or more of the CPU cores 106, 108, 110). That is, the one or more GPU cores 112, 114 pipeline a communication of the neural network 200 data structures to the one or more CPU cores 106, 108, 110.

After the GPU cores 112, 114 complete computation of their dropout matrix products for the input layer 206, the CPU cores 112, 114 forwards the activations 216 (and/or network weights) of the input layer 206 to the one or more CPU cores 106, 108, 110. In various embodiments, the GPU cores 112, 114 perform dropout by either zeroing out the activations and/or the weights of neurons 202 in any given layer. For example, with matrix multiplication as commonly known to those skilled in the art, the GPU cores 112, 114 zeroes out a portion of the rows after compute of the activations 216 for a layer (e.g., the input layer 206). Thus, the activations 216 of the input layer 206 include random zeroes in rows due to dropout of the dropped neurons 214, and the activations 216 are not organized to be efficiently utilized by the GPU cores 112, 114 for computations (as the remaining activations are not contiguous with each other in memory due to the zeroes/holes).

The one or more CPU cores 106, 108, 110 repackage the activations 216 in parallel with GPU feed forward computations to generate a coalesced activation sub-matrix 218. As illustrated in FIG. 2, the CPU cores 106, 108, 110 coalesces the activations 216 of the input layer 206 and then returns the coalesced activation sub-matrix 218 back to the GPU cores 112, 114 while the GPU cores 112, 114 is computing the forward pass for the previous layer of the neural network (i.e., input layer 206).

Similarly, after the GPU cores 112, 114 complete computation of their dropout matrix products for the hidden layer 208, the CPU cores 112, 114 forwards the activations 220 (and/or network weights) of the hidden layer 208 to the one or more CPU cores 106, 108, 110. The one or more CPU cores 106, 108, 110 repackage the activations 220 in parallel with GPU feed forward computations to generate the coalesced activation sub-matrix 222. The CPU cores 106, 108, 110 coalesces the activations 220 of the hidden layer 208 and then returns the coalesced activation sub-matrix 222 back to the GPU cores 112, 114 while the GPU cores 112, 114 is computing the forward pass for the previous layer of the neural network (i.e., hidden layer 208).

After the GPU cores 112, 114 complete computation of their dropout matrix products for the hidden layer 210, the CPU cores 112, 114 forwards the activations 224 (and/or network weights) of the hidden layer 210 to the one or more CPU cores 106, 108, 110. The one or more CPU cores 106, 108, 110 repackage the activations 224 in parallel with GPU feed forward computations to generate the coalesced activation sub-matrix 226. The CPU cores 106, 108, 110 coalesces the activations 224 of the hidden layer 210 and then returns the coalesced activation sub-matrix 226 back to the GPU cores 112, 114 while the GPU cores 112, 114 is computing the forward pass for the previous layer of the neural network (i.e., hidden layer 210).

After the hidden layers 208 and 210 complete forward propagation (i.e., feed forward computations) and sends a final output to the output layer 212, the neural network begins backpropagation (also sometimes referred to as backpropagation of errors) to adjust the weight of neurons 202 in the neural network 200 by calculating a gradient of a loss function. In various embodiments, backpropagation includes calculating error at the output layer 212 and distributing the error back through the network layers of the neural network 200. The GPU cores 112, 114 perform backpropagation based on the coalesced activation sub-matrices 218, 222, and 226, which are contiguous in memory and allow for efficient scheduling at the GPU cores 112, 114. In this manner, the neural network 200 provides a CPU-assisted pipelined, layer-wise coalescing of the dropped neural network. The coalesced neural network, as represented by the various coalesced activation sub-matrices 218, 222, and 226, reduces computation and increases compute efficiency out of the heterogeneous CPU-GPU architecture.

FIG. 3 is a flow diagram of a method 300 for CPU-assisted coalescing of a neural network according in accordance with some embodiments. The method 300 may be implemented in some embodiments of heterogeneous CPU-GPU systems such as the processor 102 shown in FIG. 1.

At block 302, the method 300 begins with one of the GPU cores 112, 114 computing an activation for each one of a plurality of neurons for a first network layer of a neural network. In one embodiment, such as described in more detail relative to FIG. 2, each neuron 202 in the input layer 206 (and also in the hidden layers 208, 210) represents a training data item and is characterized by its weight, bias, and activation function, as generally understood by those skilled in the art. In various embodiments, each of the neurons 202 performs a linear transformation on input according to its associated weights and biases. Further, a non-linear transformation is performed by an activation function (not shown). The resulting activation is transferred from the input layer 206 to the hidden layer 208. This forward movement of information is referred to as the feed forward.

At block 304, one of the GPU cores 112, 114 randomly drops a first subset of the plurality of neurons for the first network layer and keeping a second subset of the plurality of neurons for the first network layer. In one embodiment, randomly dropping the first subset of the plurality of neurons for the first network layer includes masking output from a fraction of the plurality of neurons for the first network layer. In other embodiments, dropout randomly selects a number of neurons from one or more layers of the neural network 200 to be ignored during training such that contributions from each dropped neuron is temporarily removed from the feed forward and any weight updates are not applied to the dropped neuron on the backpropagation pass.

At block 306, one of the GPU cores 112, 114 forwards the activation for each one of the second subset of the plurality of neurons to the CPU core. In some embodiments, such as described in more detail relative to FIG. 2, one of the GPU cores 112, 114 forwards activations from the neurons 202 of the input layer 206 (i.e., the neurons which were not dropped) to the CPU (e.g., at one or more of the CPU cores 106, 108, 110). The activations 216 of the input layer 206 include random zeroes in rows due to dropout of the dropped neurons 214, and the activations 216 are not organized to be efficiently utilized by the GPU cores 112, 114 for computations (as the remaining activations are not contiguous with each other in memory due to the zeroes/holes).

In some embodiments, the GPU core at block 306 also generates dropped neural network map representing structure of the neural network after randomly dropping the first subset of the plurality of neurons for the first network layer. The one or more GPU cores 112, 114 pipeline a communication of the neural network data structures to the one or more CPU cores, which then generates coalesced activation sub-matrices based on the dropped neural network map.

At block 308, one of CPU cores 106, 108, 110 coalesces the forwarded activation to generate a set of coalesced activation sub-matrices representing the second subset of the plurality of neurons. In various embodiments, such as described in more detail relative to FIG. 2, the one or more CPU cores 106, 108, 110 repackage the activations 216 in parallel with GPU feed forward computations to generate a coalesced activation sub-matrix 218. As illustrated in FIG. 2, the CPU cores 106, 108, 110 coalesces the activations 216 of the input layer 206 and then returns the coalesced activation sub-matrix 218 back to the GPU cores 112, 114 while the GPU cores 112, 114 is computing the forward pass for the previous layer of the neural network (i.e., input layer 206). At block 310, the operations of blocks 302-308 are repeated for each network layer of the neural network before performing backpropagation based on the coalesced activation sub-matrices.

Those skilled in the art will recognize that although described here in the context of heterogeneous processing systems including CPUs and GPUs, other heterogeneous architectures may be utilized without departing from the scope of this disclosure. For example, in other embodiments, Application Specific Integrated Circuits (ASICs), Tensor Processing Units (TPUs), or Field-Programmable Gate Arrays (FPGAs) may be paired with CPUs to perform the CPU-assisted and layer-wise coalescing of neural networks for use with dropout training.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, those skilled in the art appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
computing, at a graphics processing unit (GPU) core of a processing system including at least a central processing unit (CPU) core and the GPU core, an activation for each one of a plurality of neurons for a first network layer of a neural network;
randomly dropping a first subset of the plurality of neurons for the first network layer and keeping a second subset of the plurality of neurons for the first network layer; and
coalescing, at the CPU core, the activation for each one of the second subset of the plurality of neurons to generate a set of coalesced activation sub-matrices representing the second subset of the plurality of neurons, wherein the set of coalesced activation sub-matrices are contiguous in a memory of the processing system.

2. The method of claim 1, wherein randomly dropping the first subset of the plurality of neurons for the first network layer comprises masking output from a fraction of the plurality of neurons for the first network layer.

3. The method of claim 1, further comprising:
generating, at the GPU core, a dropped neural network map representing a structure of the neural network after randomly dropping the first subset of the plurality of neurons for the first network layer.

4. The method of claim 3, further comprising:
transmitting the dropped neural network map from the GPU core to the CPU core; and
generating the set of coalesced activation sub-matrices based on the dropped neural network map.

5. The method of claim 1, further comprising:
forwarding the activation for each one of the second subset of the plurality of neurons to a second plurality of neurons for a second network layer of the neural network; and
computing, at the GPU core, the activation for each one of the second plurality of neurons in parallel with the CPU core coalescing the activation for each of the second subset of the plurality of neurons of the first network layer.

6. The method of claim 1, further comprising:
forwarding the set of coalesced activation sub-matrices from the CPU core to the GPU core.

7. The method of claim 1, further comprising:
forwarding a network weight associated with each one of the second subset of the plurality of neurons to the CPU core; and
coalescing, at the CPU core, the activation for each one of the second subset of the plurality of neurons and the forwarded network weight to generate the set of coalesced activation sub-matrices.

8. A system, comprising:
a central processing unit (CPU) core;
a graphics processing unit (GPU) core configured to compute an activation for each one of a plurality of neurons for a first network layer of a neural network; and
a dropout module circuit configured to randomly drop a first subset of the plurality of neurons for the first network layer and keep a second subset of the plurality of neurons for the first network layer, and wherein the dropout module circuit is further configured to instruct the CPU core to coalesce the activation for each one of the second subset of the plurality of neurons to generate a set of coalesced activation sub-matrices that are contiguous in a memory.

9. The system of claim 8, wherein the GPU core forwards the activation for each one of the second subset of the plurality of neurons to the CPU core.

10. The system of claim 9, wherein the CPU core coalesces the forwarded activation for each one of the second subset of the plurality of neurons to generate the set of coalesced activation sub-matrices to represent the second subset of the plurality of neurons.

11. The system of claim 8, wherein the GPU core randomly drops the first subset of the plurality of neurons for the first network layer by masking output from a fraction of the plurality of neurons for the first network layer.

12. The system of claim 8, wherein the GPU core generates a dropped neural network map representing a structure of the neural network after randomly dropping the first subset of the plurality of neurons for the first network layer.

13. The system of claim 12, wherein:
the GPU core transmits the dropped neural network map to the CPU core; and
the CPU core generates the set of coalesced activation sub-matrices based on the dropped neural network map.

14. The system of claim 8, wherein:
the GPU core forwards the activation for each one of the second subset of the plurality of neurons to a second plurality of neurons for a second network layer of the neural network; and
the GPU core computes the activation for each one of the second plurality of neurons in parallel with the CPU core coalescing the activation for each one of the second subset of the plurality of neurons of the first network layer.

15. The system of claim 8, wherein:
the CPU core forwards the set of coalesced activation sub-matrices to the GPU core; and
the GPU core performs backpropagation based on the set of coalesced activation sub-matrices.

16. The system of claim 8, wherein:
the GPU core forwards a network weight associated with each one of the second subset of the plurality of neurons to the CPU core; and
the CPU core coalesces the activation for each on of the second subset of the plurality of neurons and the forwarded network weight to generate the set of coalesced activation sub-matrices.

17. A non-transitory computer readable storage medium embodying a set of executable instructions, the set of executable instructions to manipulate at least one processor to:
- compute, at a graphics processing unit (GPU) core, an activation for each one of a plurality of neurons for a first network layer of a neural network;
- randomly drop a first subset of the plurality of neurons for the first network layer and keep a second subset of the plurality of neurons for the first network layer; and
- coalesce, at a CPU core, the activation for each one of the second subset of the plurality of neurons to generate a set of coalesced activation sub-matrices representing the second subset of the plurality of neurons, wherein the set of coalesced activation sub-matrices are contiguous in a memory of a processing system.

18. The non-transitory computer readable storage medium of claim 17, wherein the set of executable instructions is to manipulate at least one processor to generate, at the GPU core, a dropped neural network map representing a structure of the neural network after randomly dropping the first subset of the plurality of neurons for the first network layer.

19. The non-transitory computer readable storage medium of claim 17, wherein the set of executable instructions is to manipulate at least one processor to forward the activation for each one of the second subset of the plurality of neurons to a second plurality of neurons for a second network layer of the neural network, and further compute, at the GPU core, the activation for each one of the second plurality of neurons in parallel with the CPU core coalescing the activation for each one of the second subset of the plurality of neurons of the first network layer.

20. The non-transitory computer readable storage medium of claim 17, wherein the set of executable instructions is to manipulate at least one processor to perform backpropagation based on the set of coalesced activation sub-matrices.

* * * * *

UNITED STATES PATENT AND TRADEMARK OFFICE
CERTIFICATE OF CORRECTION

| | | |
|---|---|---|
| PATENT NO. | : 11,620,525 B2 | Page 1 of 1 |
| APPLICATION NO. | : 16/141648 | |
| DATED | : April 4, 2023 | |
| INVENTOR(S) | : Abhinav Vishnu | |

It is certified that error appears in the above-identified patent and that said Letters Patent is hereby corrected as shown below:

In the Claims

At Column 9 Line 62, Claim 5, please correct "the activation for each of the" to be --the activation for each one of the--

At Column 10 Line 64, Claim 16, please correct "the activation for each on of the" to be --the activation for each one of the--

Signed and Sealed this
Twenty-sixth Day of September, 2023

Katherine Kelly Vidal
*Director of the United States Patent and Trademark Office*